(12) United States Patent
Rockwell

(10) Patent No.: US 6,478,439 B1
(45) Date of Patent: Nov. 12, 2002

(54) APPARATUS FOR ATTACHING A CHEMILUMINESCENT DEVICE TO A FISHING LINE

(76) Inventor: Edward T. Rockwell, 1427 Main St., Leominster, MA (US) 01453

( * ) Notice: Subject to any disclaimer, the term of this patent is extended or adjusted under 35 U.S.C. 154(b) by 0 days.

(21) Appl. No.: 09/676,684

(22) Filed: Sep. 29, 2000

(51) Int. Cl.⁷ .............................................. A01K 85/00
(52) U.S. Cl. ........................... 362/84; 362/34; 362/396; 43/17.6
(58) Field of Search ............................ 362/34, 396, 84, 362/551, 565, 577, 217; 43/17.5, 17.6

(56) References Cited

U.S. PATENT DOCUMENTS

| | | | |
|---|---|---|---|
| 2,466,939 A | 4/1949 | Fowler | 24/237 |
| 5,043,851 A | 8/1991 | Kaplan | 362/34 |
| 5,213,405 A * | 5/1993 | Giglia | 362/34 |
| D357,882 S | 5/1995 | Navarz et al. | D10/114 |
| 5,531,418 A | 7/1996 | Lindgren | 248/317 |
| 5,673,988 A | 10/1997 | Fujita | 362/34 |
| 5,797,669 A | 8/1998 | Fujita | 362/34 |
| 6,021,595 A * | 2/2000 | Noel | 43/17.6 |
| 6,079,147 A | 6/2000 | Mosher | 43/44.95 |
| 6,364,499 B1 * | 4/2002 | Jones | 362/109 |

* cited by examiner

Primary Examiner—Sandra O'Shea
Assistant Examiner—Anabel Ton
(74) Attorney, Agent, or Firm—Caracappa and Associates; David N. Caracappa

(57) ABSTRACT

A mechanism for attaching a light stick to a filament, includes opposing elements having proximal ends attached to the light stick and distal ends. A gap is formed between the elements. Near the distal end the gap is tapered to form a funnel portion wider than the filament. Near the proximal end the gap forms a gripping portion narrower than the filament.

32 Claims, 4 Drawing Sheets

APPARATUS FOR ATTACHING A CHEMILUMINESCENT DEVICE TO A FISHING LINE

FIELD OF THE INVENTION

The present invention relates to the use of a chemiluminescent device as bait while fishing, and in particular to apparatus for attaching a chemiluminescent device to a filament, such as a fishing line.

BACKGROUND OF THE INVENTION

It is known to use chemiluminescent devices (referred to as light sticks in the remainder of this application) as bait for ocean fishing. Such devices are attached to the fishing lines on commercial long line fishing vessels. These fishing lines are deployed into the water, retrieved at a later time, and the spent light sticks removed along with (it is hoped) the fish. The line is then re-baited with fresh light sticks and re-deployed into the water.

Known light sticks include various mechanisms for attaching them to fishing lines. Some mechanisms allow the light stick to move freely along the line. U.S. Pat. No. 6,079,147 (issued Jun. 27, 2000 to Mosher) represents such a mechanism applied to a fishing bobber, and U.S. Pat. Nos. Des. 357,882 (issued May 2, 1995 to Navarez et al.), 5,043,851 (issued Aug. 27, 1991 to Kaplin), and 5,673, 988 and 5,797,669 (issued Oct. 7, 1997 and Aug. 25, 1998, respectively, both to Fujita) all represent mechanisms for attaching a light stick to e.g. a string, such as a fishing line, in such a manner that it may slide along the string. This, however, can be a problem because the light stick is able to move away from the desired location along the fishing line, e.g. near the hook.

Other known light sticks include mechanisms for attaching them to fishing lines without slipping from the desired location. For example, U.S. Pat. No. 6,021,595 (issued Feb. 8, 2000 to Noel) discloses a light stick with a fixing means integrated with the light stick body. This fixing means includes a side notch leading to a longitudinal slot. The longitudinal slot terminates with three rectilinear grooves of different sizes. The fishing line is slipped into the side of the light stick fixing means through the side notch. Then the fishing line is pulled into the longitudinal slot until the fishing line is seated within the appropriately sized rectilinear groove. The fishing line is firmly held in the groove by the pinching action of the longitudinal slot.

U.S. Pat. No. 2,466,939 (issued Apr. 12, 1949 to Fowler) illustrates an attaching snap which could be adapted to operate with a light stick. This snap is constructed of a unitary strip of inherently springy or resilient material bent into a relatively complicated double-U shape. The snap may be attached to a light stick. This snap is pushed sideways onto the fishing line, then the line is pulled to the end of the snap, which snaps against the line holding the snap tightly on the fishing line.

U.S. Pat. No. 5,213,405 (issued May 25, 1993 to Giglia) illustrates a light stick with an attachment means adapted for a fishing line. This attachment means includes an interior arm, and two opposed exterior arms. The arms are beveled to more easily accept the fishing line. The attachment means is made of a different material than the light stick itself, having a higher tensile strength and stiffness. Projections are positioned along the interior edges of the arms to help maintain the position of the device on the fishing line. The attachment means is designed so the light stick is pulled onto the fishing line.

U.S. Pat. No. 5,531,418 (issued Jul. 2, 1996 to Lindgren) illustrates a light stick with one end adapted for attaching to a fishing line. One end of the light stick is a relatively flattened shape. The flattened shape has cut into it a set of slots forming a T-shape which has a longer slot along the axis of the light stick and a shorter slot perpendicular to the longer slot. A second set of side slots are parallel with the shorter slot of the T-shape. The fishing line is inserted into the T-shaped slots, looped around the body of the light stick, pulled into the side slots and pulled tight. A flap defined by the side slots folds over and locks the light stick to the fishing line.

The above mechanisms secure the light stick to the fishing line so it does not move along the fishing line. However, some of them operate in such a manner, and are fabricated of such materials that the fishing line may be abraded by the application and removal of the light stick (e.g. Fowler, Giglia, Noel). This weakens the fishing line making it more easy for the stress fractures of the line to appear. Such stress fractures will lead to breakage of the fishing line. If the fishing line breaks, obviously, valuable fish, and the fishing line itself, will be lost. Thus, it is important that the light stick used for bait not be the source of such abrasion.

The above mechanisms further require either that the light stick be pushed sideways onto the fishing line (Noel); and/or that the light stick be grasped and pulled onto the fishing line (e.g. Noel, Giglia, Fowler). In addition, some of the attachment mechanisms provide a relatively small "target" for the fishing line. That is, the opening into which the fishing line must be inserted is relatively small, in some cases not much larger than the diameter of the fishing line itself. Furthermore, one (Lindgren) requires a relatively complicated entwining of the fishing line with the light stick. However, commercial fishermen usually work in cold, wet and often slippery conditions, usually with thick gloves on. This severely limits the dexterity they have. This makes applying and removing such light sticks difficult.

A light stick which is adapted to be easily attached to and removed from a fishing line under the adverse conditions on commercial fishing vessels, as described above; which attaches to the fishing line firmly without moving from the place it is attached. It is further desirable that such an attachment mechanism will not abrade the fishing line when attached to or removed from the fishing line is desirable.

BRIEF SUMMARY OF THE INVENTION

In accordance with principles of the present invention, a mechanism for attaching a light stick to a filament, includes opposing elements having proximal ends attached to the light stick and distal ends. A gap is formed between the elements. Near the distal end the gap is tapered to form a funnel portion wider than the filament. Near the proximal end the gap forms a gripping portion narrower than the filament. In accordance with another aspect of the invention, the attachment mechanism is fabricated from softer material than that of the fishing line.

A light stick according to the invention may be pushed onto a fishing line easily under the adverse conditions on a commercial fishing vessel. Once attached, the light stick will not move along the fishing line. If the attachment mechanism is fabricated of a material which is softer than the fishing line, then the fishing line will not be abraded even with repeated applications and removals of light sticks.

DETAILED DESCRIPTION OF THE INVENTION

Figure 1:
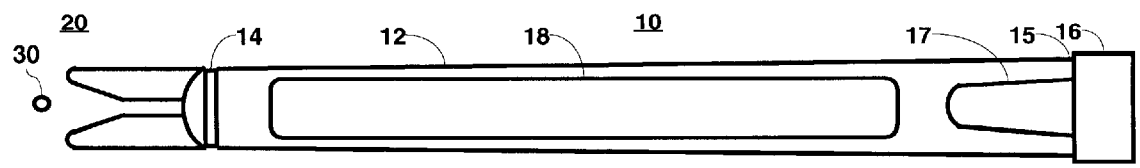
FIG. 1 is a side view of a chemiluminescent device including an attachment mechanism according to principles of the present invention.

FIG. 1 is a side view of a chemiluminescent device (light stick) including an attachment mechanism according to principles of the present invention. In FIG. 1 a light stick is illustrated having a body 10 and the attachment mechanism 20. The body 10 of the light stick is constructed according to well known principles, and includes a outer container 12 having a closed end 14 and an open end 15. The open end 15 is closed with a cap 16 which includes a portion 17 projecting into the interior of the outer container 12. This projecting portion 17 operates to reduce the amount of chemicals necessary to fill the light stick, in a known manner. Also inserted within the outer container 12 is an ampoule 18.

As is well known, the outer container 12 is fabricated of a material which is flexible and resistant to rupture. For example, low density polyethylene (LDPE) is a preferred material. The typical cross-sectional shape (not shown) of the outer container 12 is circular. The typical thickness of the walls of the outer container 12 is around 0.065 inches. The ampoule 18 is fabricated of a material which is easily breakable when flexed, such as glass. A typical overall length for a light stick is around 6 inches, and a typical cross-sectional width is around 0.5 inches. One skilled in the art will understand that all of these dimensions, the cross-sectional shape, and indeed the overall shape of such a chemiluminescent device vary widely. The skilled practitioner will also understand that the size and shape of the chemiluminescent device is not germane to the present invention.

In operation, the ampoule 18 is filled with a first chemical and inserted into the outer container 12. The remainder of the outer container 12 is filled with a second chemical, and the cap 16 is attached to the outer container 12 to form a leak-proof seal. As is well known, when the first chemical is mixed with the second chemical a chemical reaction takes place which produces light. Thus, to activate the light stick, the user bends the light stick. This breaks the ampoule 18 without rupturing the outer container 12. The two chemicals intermix, react, and produce light.

The attachment mechanism 20, which is described in more detail below, is used to attach the light stick to a filament which, in the present application is a fishing line. One skilled in the art will, however, understand that a light stick according to principles of the present invention may be attached to any such filament for any reason.

In operation, a fishing line, shown in cross-sectional view as 30 in FIG. 1, is pressed into the attachment mechanism 20. The attachment mechanism grips the fishing line 30 firmly, as will be described in more detail below. The fishing line 30, with the light stick attached in this manner, is then deployed in the water. After a time, the fishing line is retrieved. The light stick is then removed from the line by either pulling it off the line, or pushing on the tip of the attachment mechanism 20.

Figure 2:
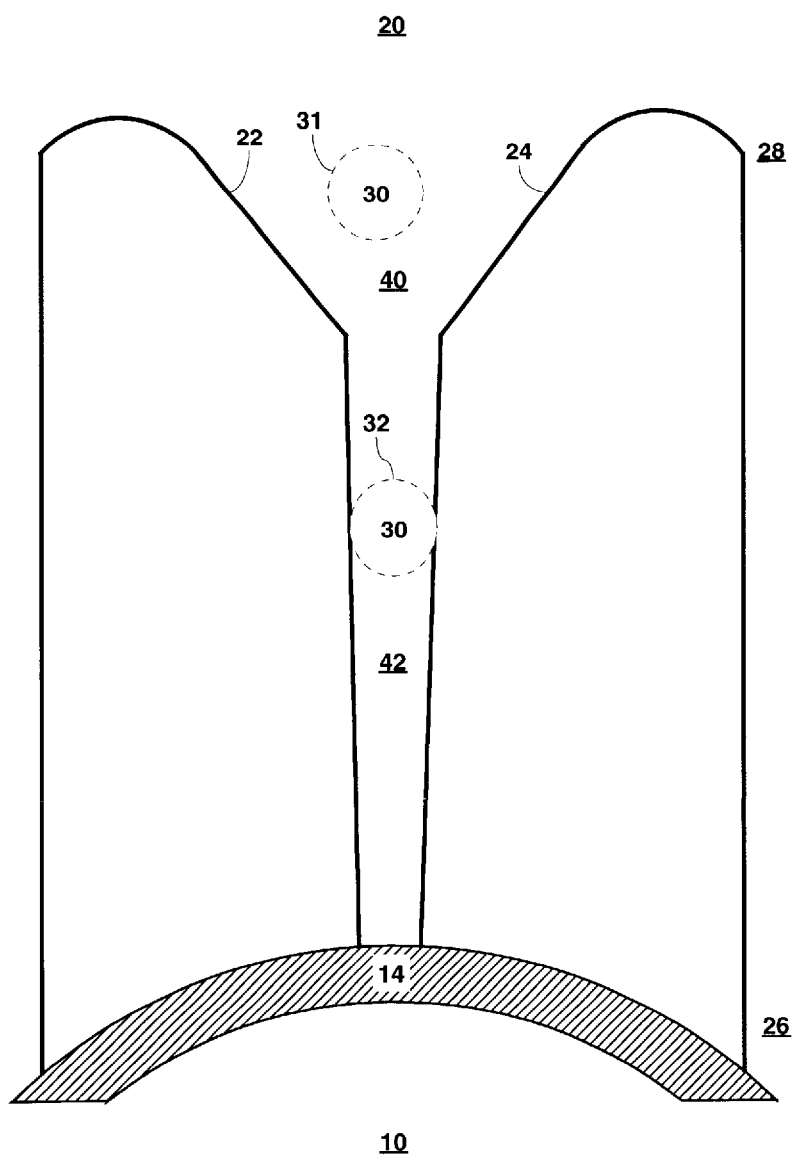
FIG. 2 is a more detailed illustration of an attachment mechanism according to principles of the present invention.

FIG. 2 is a more detailed illustration of an attachment mechanism 20 according to principles of the present invention. In FIG. 2, the closed end 14 of the body 10 of the light stick is shown in cross-hatching. The attachment mechanism 20 is attached to the closed end 14. The attachment mechanism 20 includes a pair of opposed elements 22 and 24. The proximal ends of the elements 22 and 24 are attached to the closed end 14 of the outer container 12 of the body 10 of the light stick. The distal ends of the elements 22 extend away from the body 10 of the light stick. The elements form a gap between them which is arranged to form a funnel shaped portion 40 near the distal ends of the elements 22 and 24, and a gripping portion 42 near the proximal ends of the elements 22 and 24. The gap in the funnel portion 40 is wider than the fishing line, while the gap in the gripping portion 42 is narrower than the fishing line. The gripping portion 42 may have a varying width which is wider at the distal end and narrowing toward the proximal end. The elements 22 and 24 are made of relatively flexible material and are fabricated so that they can also move relative to each other. For example, the attachment mechanism 20, i.e. elements 22 and 24, may be fabricated by the same material, LDPE, as the outer container 12 of the body 10 of the light stick, and may be fabricated at the same time as, and as an integral part of, the outer container 12 body 10 of the light stick.

In operation, the attachment mechanism 20 is pushed toward a fishing line 30, as illustrated in position 31. The funnel shaped portion 40 guides the fishing line 30 toward the gripping portion 42 as the light stick 10 is pushed. When the fishing line 30 reaches the gripping portion 42, the elements 22 and 24 begin to deform at the respective points of contact with the fishing line 30 and/or flex as a whole, pinching the fishing line 30 between them. It is also possible that the fishing line a 30 distorts from the pressure applied by the elements 22 and 24. When the fishing line 30 is pushed sufficiently into the gripping portion 42, the pinched fishing line 30 is held firmly between them, holding the light stick 10 on the fishing line 30 and keeping the light stick 10 from moving along the fishing line 30.

As described above, the elements 22 and 24 are fabricated of a relatively soft and pliable material, such as LDPE. The fishing line 30, on the other hand, is typically fabricated of a harder material than the LDPE. In particular, some fishing lines 30 are fabricated of nylon, and others of materials proprietary to the manufacturers but of similar properties to nylon. In all cases, however, the fishing line 30 materials are known to be harder than LDPE. Provided the fishing line 30 is fabricated of a harder material than the elements 22 and 24 of the attachment mechanism 20, the attachment mechanism 20 will not abrade the fishing line 30 when being applied to or removed from the fishing line 30. Furthermore, by fabricating the attachment mechanism 20 integral with, and of the same material as, the body 10 of the light stick, subsequent assembly of the light stick and attachment mechanism is obviated, and fabrication costs are minimized.

Figure 3:
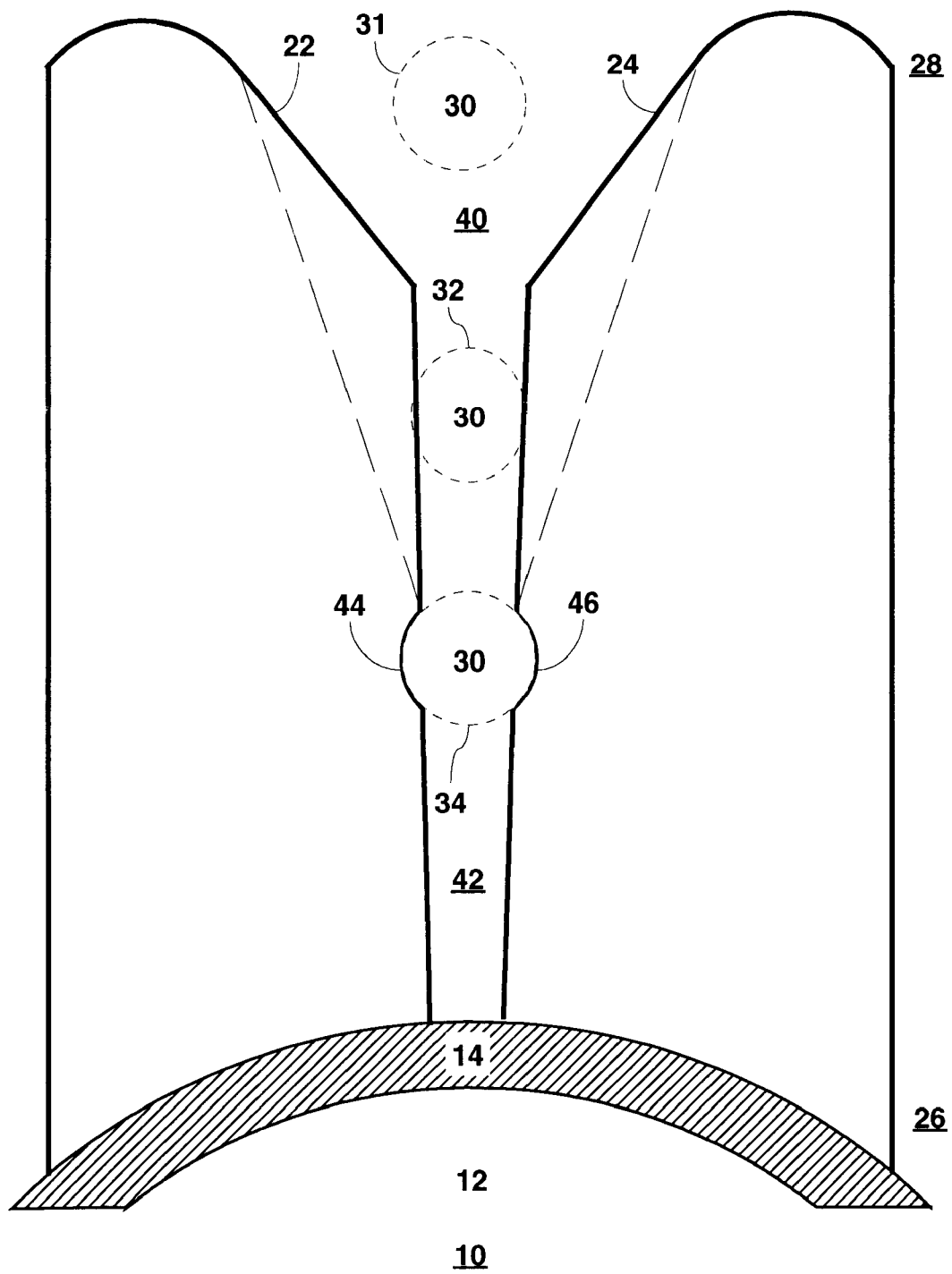
FIG. 3 is a more detailed illustration of another embodiment of an attachment mechanism according to principles of the present invention.

FIG. 3 is a more detailed illustration of another embodiment of an attachment mechanism 20 according to principles of the present invention. In FIG. 3, elements which are the same as those illustrated in the preceding figures are designated by the same reference numbers and are not described in detail below. In FIG. 3, a pair of substantially arctuate concave indentations 44 and 46 are formed at respective facing locations within the gripping portion 42 of the gap of the attachment mechanism 20 formed by elements 22 and 24 respectively. These two substantially arctuate concave indentations 44 and 46 define respective portions of a substantially circular channel which is slightly smaller than the size of the fishing line 30.

As described above, the light stick is pushed toward the fishing line 30 so that the fishing line 30 is captured in the funnel portion 40 of the attachment mechanism 20. This is shown by the fishing line 30 in position 31. As the light stick is pushed onto the fishing line 30, the fishing line 30 enters the gripping portion 42 of the attachment mechanism 20. The elements 22 and 24 both deform and bend to separate to conform to the fishing line 30, as described above. In addition the fishing line 30 deforms slightly as well. This is shown by the fishing line 30 in position 32. As the fishing line is pushed further into the gripping portion 42, it reaches the pair of arctuate concave indentations 44 and 46. The arctuate concave indentations 44 and 46 are sized and spaced such that the elements 22 and 24 return partially to their unstressed positions when the fishing line 30 reaches this point. At this point, the fishing line is gripped by the gripping portion 42 between the elements 22 and 24, while the arctuate concave indentations 44 and 46 act as a detent.

The funnel portion 40 can run from the distal end 28 and extend to, and terminate at, the arctuate concave indentations 44 and 46 as shown in phantom in FIG. 3. This increases the size of the funnel portion, and makes it easier to capture the fishing line 30 within the funnel portion 40 formed by the elements 22 and 24.

Figure 4:
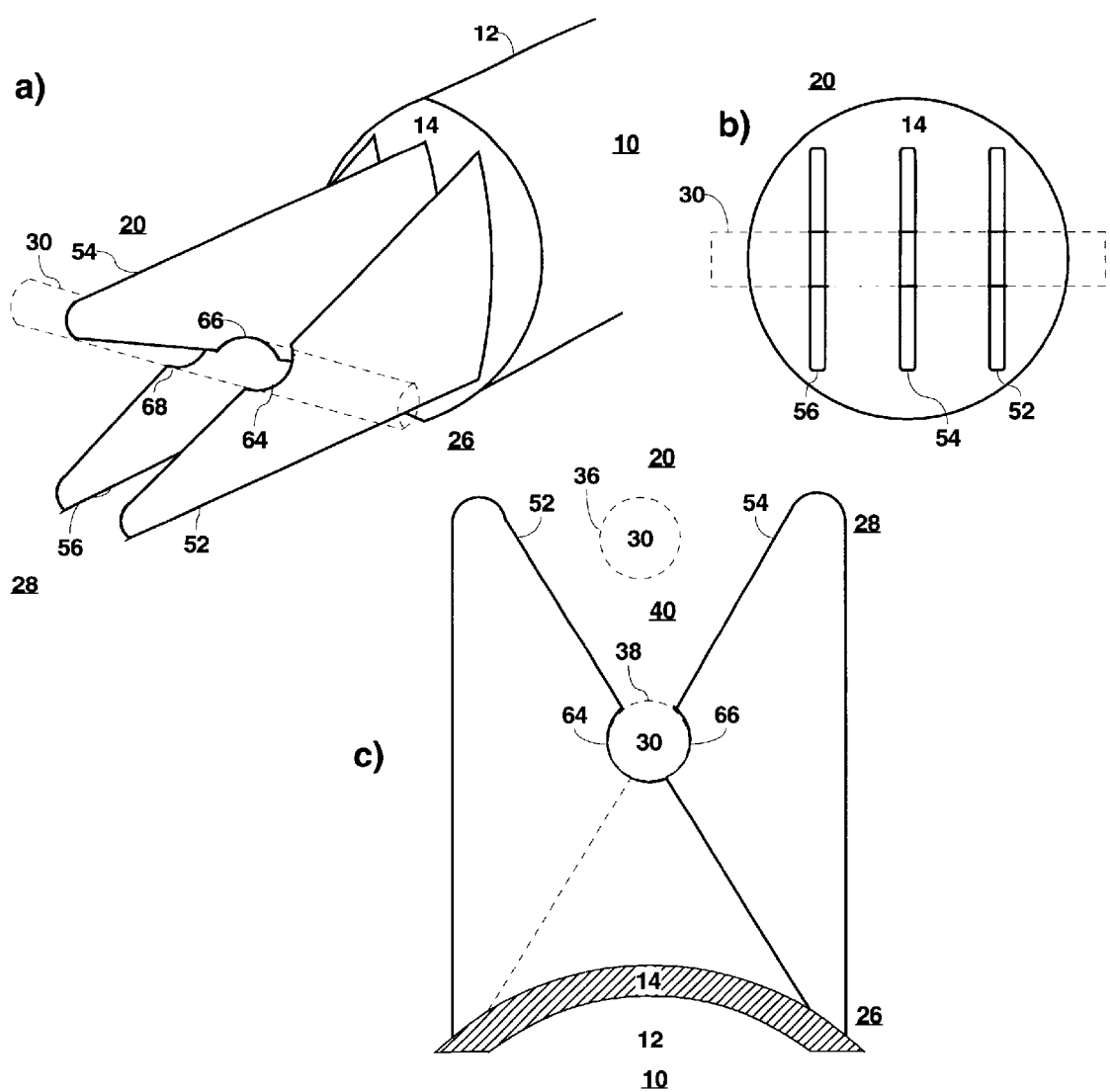
FIGS. 4a, b and c are more detailed illustrations of another embodiment of an attachment mechanism according to principles of the present invention.

FIGS. 4a, b and c are more detailed illustrations of another embodiment of an attachment mechanism 20 according to principles of the present invention. In FIG. 4, elements which are the same as those in the preceding figures are designated with the same reference numbers and are not described in detail below. FIG. 4a is an orthogonal view of the embodiment of the attachment mechanism 20. In FIG. 4a, three elements 52, 54 and 56 are relatively flat and placed parallel each other in a transverse direction on the closed end 14 of the light stick. This may be seem more clearly on FIG. 4b, which is an end view of the attachment mechanism 20 looking along the axis of the light stick from the distal end 28 toward the proximal end 26 of the attachment mechanism 20.

Referring again to FIG. 4a, the elements 52, 54 and 56 are rounded right trianguloid in shape and are substantially identical to each other. One of the elements, 54, is located at a relatively central location on the closed end 14, and is tapered in a first direction from the proximal end 26 to the distal end 28 of the attachment mechanism 20. The other elements, 52 and 56, are each located on either side of the central element 54, near the outside of the closed end 14, and are tapered from the proximal end 26 to the distal end 28 of the attachment mechanism 20 in the opposite direction to that of the central element 54. FIG. 4c is a view of the attachment mechanism 20 along g the transverse direction on. In FIG. 4c, element 52 is on the left side and is closest to the viewer, element 54 is on the right side behind element 52, and element 56 is on the left side, hidden behind element 52. As illustrated in FIG. 4c, the opposing tapers of the outer elements 52 and 56 (hidden) versus that of the central element 54 form a funnel portion 40 between them.

Each of the outer elements 52 and 56 include a substantially arctuate concave indentation, 64 and 68, respectively.

The element 54 also includes a substantially arctuate concave indentation 66. As illustrated in FIG. 4c, the respective substantially arctuate concave indentations 64, 66 and 68 (hidden) are substantially aligned in the transverse direction to define a channel running transversely.

In operation, referring to FIG. 4c, the light stick is pushed toward a fishing line 30. The fishing line 30, shown in phantom in position 36, is led to the funnel portion 40. As the light stick is pushed further, the fishing line contacts the three elements 52, 54 and 56 (hidden behind element 52). The elements 52, 54 and 56 begin to deform at the point of contact, and to move apart as the fishing line 30 is pushed further into the attachment mechanism 20. The fishing line 30 eventually is pushed into position within the channel formed by the substantially arctuate concave indentations 64 and 68 (hidden), on elements 52 and 56 (hidden) respectively, on one side and the substantially arctuate concave indentation 66, on element 54, on the other side. The fishing line 30 is held by the respective substantially arctuate indentations 64, 66 and 68 (hidden), as shown in position 38 in FIG. 4c and in phantom in FIG. 4a. As before, the fishing line 30 may also deform slightly, and in the embodiment illustrated in FIG. 4 can also bend slightly. When the fishing line 30 is in position 38 it is held securely by the attachment mechanism 20 of the light stick, and the light stick will not move along the fishing line 30. Also as before, the elements 52, 54 and 56 may be fabricated from the same material as the light stick, e.g. LDPE, and may be formed simultaneously with, and as an integral part of, the light stick.

Figure 5:
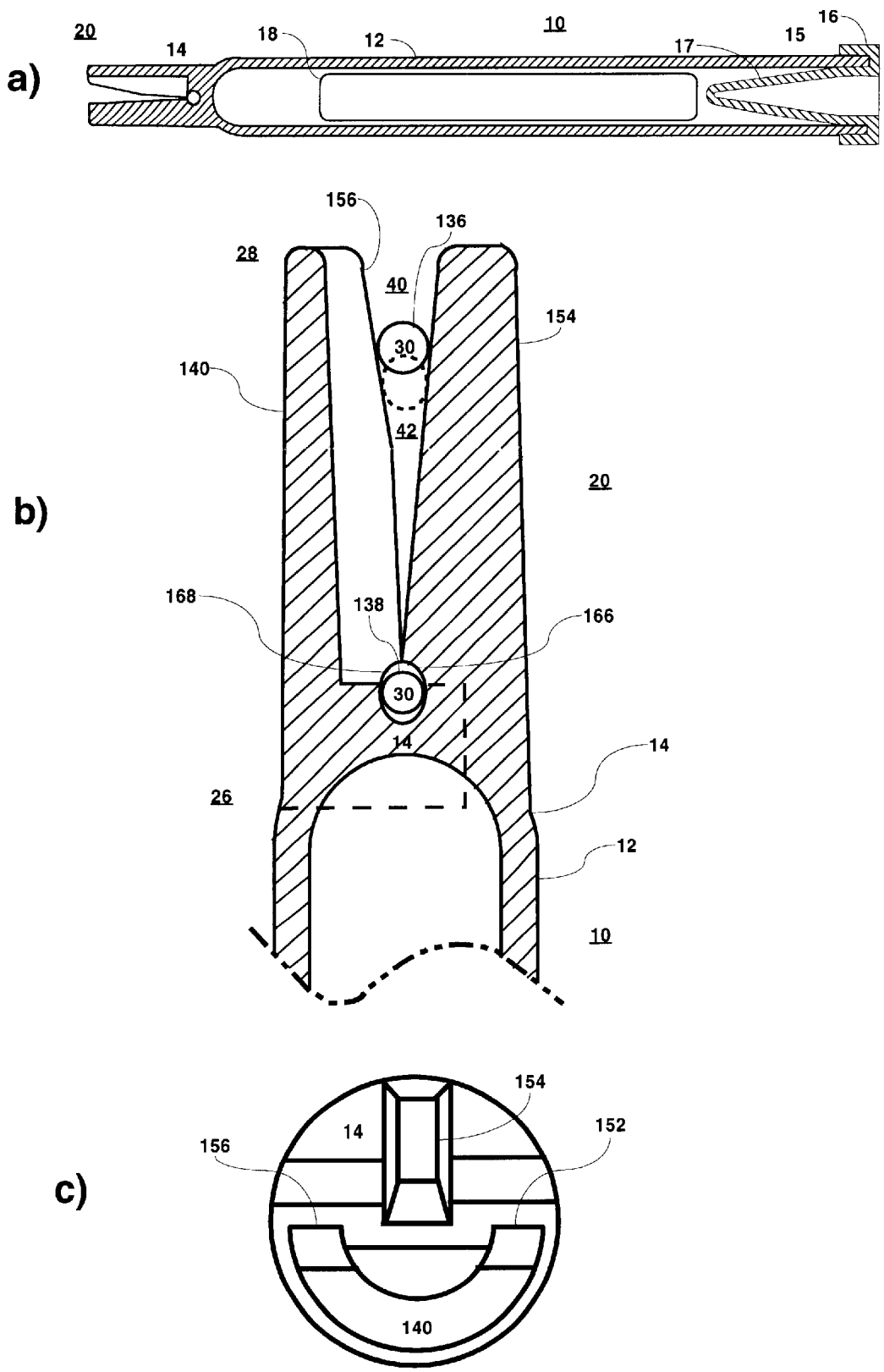
FIGS. 5a, b and c are more detailed illustrations of a preferred embodiment of an attachment mechanism according to principles of the present invention.

The embodiment illustrated in FIG. 4 can be made stronger as illustrated by the preferred embodiment illustrated in FIG. 5. FIGS. 5a, b and c are more detailed illustrations of a preferred embodiment of an attachment mechanism 20 according to principles of the present invention. Elements in FIG. 5 which are the same as those illustrated in preceding Figures are designated by the same reference numbers and are not described in detail below. FIG. 5a, is a diagram illustrating a light stick sectioned along the longitudinal axis. FIGS. 5b and c are more detailed illustrations of the attachment mechanism 20. FIG. 5b is a more detailed sectional view corresponding to FIG. 5a. FIG. 5c is an end view looking along the longitudinal axis of the light stick from the distal end 28 toward the proximal end 26 of the attachment mechanism 20.

The embodiment illustrated in FIG. 5 is similar to that illustrated in FIG. 4 except that the outer elements 52 and 56 (of FIG. 4) are formed of a single member 140, instead of from two separate elements. The center element 154 corresponds to the center element 54 (of FIG. 4), and, as in FIG. 4, is attached to the closed end 14 of the light stick at a relatively central location. The center element 154 is tapered from the distal end 28 to the proximal end 26. The single member 140 is substantially semicircular in cross-section along the direction between the distal end 28 and the proximal end 26. It is attached to the closed end 14 of the light stick so that the center of the semicircular cross-section is located substantially at the location where the taper of the center element 154 meets the closed end 14 of the light stick. The ends of the semicircular cross-section of the single member 140 are located to oppose the taper of the center element 154, and form two outer elements 152 and 156, corresponding to the elements 52 and 56 (of FIG. 4), respectively, as shown in FIGS. 5b and c.

Referring to FIG. 5b, the distal ends 28 of the two outer elements 152 (not shown in the cross-section illustrated) and 156, and the whole length of the center element 154, are tapered to form a funnel portion 40 between the elements 152, 154 and 156. At the proximal ends of the elements 152, 154 and 156, substantially arctuate concave indentations 164, 166, and 168, respectively, are formed. In FIG. 5b, the sectioned view shows the substantially arctuate concave indentation 166 formed in the center element 154, and the substantially arctuate concave indentation 168 formed in the outer element 156 away from the viewer. The substantially arctuate concave indentation 164 formed by the outer element 152 closest to the viewer is not shown due to the sectioned view, but one skilled in the art will understand its presence and that it is directly in front of indentation 168. The substantially arctuate concave indentations 164, 166 and 168 are aligned transversely with each other to form a channel within which the fishing line 30 is gripped when inserted into the attachment mechanism 20. In the illustrated embodiment, the indentations 164, 166, and 168 are longer in the axial direction and shorter in the transverse direction forming a rounded rectangular channel.

In operation, the light stick is pushed toward the fishing line 30. The fishing line 30 is led toward the funnel portion 40 until it is in contact with the outer elements 152 and 156 and the inner element 154, as shown in position 136. The light stick is pushed further into the gripping portion 42. While in this area the outer elements 152 and 156 and the inner element 154 both deform at the point of contact with the fishing line 30 and bend away until the fishing line 30 is pushed into the channel formed by the respective substantially arctuate indentations 164, 166 and 168, as shown in position 138. The channel has dimensions slightly smaller than the diameter of the smallest fishing line 30 likely to be in use. The channel acts as a detent holding the light stick on the fishing line 30. Thus, when the fishing line 30 is in the channel, it is held firmly, and does not slip along the fishing line.

More specifically, in the preferred embodiment illustrated in FIG. 5, the attachment mechanism 20 is fabricated integrally with, and of the same material as, the body 10 of the light stick. In the preferred embodiment, the material from which the light stick body 10 and attachment mechanism 20 are fabricated is LDPE. The light stick body 10 and attachment mechanism 20 as illustrated in FIG. 5 may be fabricated as a single piece by injection molding in a known manner. The overall length of the light stick from the open end 15 to the distal end 28 of the attachment mechanism is around 5.9 inches. The cross sectional shape of the light stick is substantially circular with an outside diameter of around 0.5 inches, except in the area of the attachment mechanism 20 as illustrated in the Figures. The thickness of the walls of the outer container 12 is around 0.065 inches, leaving an inside diameter of around 0.370 inches. The light stick gradually reduces in diameter from the open end 15 to the closed end 14 by a draft angle of around 0.25 degrees. The length of the attachment mechanism 20 is around 1 inch. The angle of the taper of the outer elements 152 and 156, and the center element 154, to form the funnel portion 40, is around 15 degrees.

The length of the channel formed by the substantially arctuate indentations 164, 166 and 168 along the longitudinal axis of the light stick is around 0.110 inches. The width of the channel in the transverse direction is around 0.070 inches. The channel formed by the indentations 164, 166 and 168 allows fishing lines 30 of varying diameters to be used effectively with the attachment mechanism 20. In the illustrated embodiment, the fishing line 30 is assumed to be nylon or other similar material, which may be proprietary to the manufacturer of the fishing line. In all cases, however, the fishing line is fabricated of harder material than the LDPE from which the attachment mechanism 20 is fabricated. The diameter of the fishing line varies from manufacturer to manufacturer, and even from run to run of the same brand fishing line from the same manufacturer. Fishing lines used in commercial fishing currently run from smaller diameters of around 0.075 inches, to typical diameters of around 0.090 inches. In FIG. 5, fishing lines of these two diameters are shown. The larger has the diameter of 0.090 (shown as 30 in FIG. 5), while the smaller has the diameter of 0.075 inches (shown in phantom in FIG. 5).

Because the channel has a narrower transverse dimension (0.070 inches) than that of the smaller fishing line (0.075 inches), that size fishing line is held firmly. If a larger fishing line (0.090 inches or larger) is used instead, the elements 152, 154 and 156 spread apart to accommodate the fishing line, while the indentations 164, 166 and 168 act as detents, to hold the larger fishing line firmly. In either case, the fishing line 30 is held firmly by the indentations 164, 166 and 168 forming the channel. One skilled in the art will understand, however, that the channel may be sized appropriately for fishing lines of any range of diameters. That is, the narrower transverse dimension will be made slightly smaller than the smallest fishing line which might be used, while the wider axial dimension will be sized to act as a detent for the largest fishing line which might be used.

Because the light stick is pushed onto the fishing line 30, and may either be pulled off, or pushed off by pressing on the distal end 28 of the attachment mechanism 20, it is easily applied to and removed from the fishing line 30, even under the demanding conditions of commercial fishing, as described above. Once applied to the fishing line 30, the light stick is held firmly at the position to which it was applied. In addition, because the light stick body 10 and attachment mechanism 20 is fabricated of a material which is softer than that of the fishing line, there is no danger of abrading the fishing line even by repeated applications and removals of light sticks. Furthermore, when the light stick is fabricated of the same material as, and integrally with, the attachment mechanism 20, and they are fabricated simultaneously in a single manufacturing step (such as injection molding) the combination of the light stick and attachment mechanism 20 may be made less expensively than when the attachment mechanism 20 is made by a separate manufacturing step and attached to the light stick with a further assembly step.

What is claimed is:

1. A mechanism for attaching a light stick to a filament, comprising:

opposing elements, having proximal ends attached to the light stick and distal ends, wherein a gap is formed between the elements which near the distal end is tapered to form a funnel portion wider than the filament, and near the proximal end forms a gripping portion narrower than the filament.

2. The mechanism of claim 1 wherein the gap forming the gripping portion is of varying width, wider toward the distal end and narrower toward the proximal end.

3. The mechanism of claim 1 wherein the elements are formed of the same material as, and integrally with, the light stick.

4. The mechanism of claim 1 wherein the elements are formed of material which is relatively flexible.

5. The mechanism of claim 4 wherein the elements can move relative to each other.

6. The mechanism of claim 1 wherein the elements are formed of a material which is softer than that of the filament.

7. The mechanism of claim 6 wherein the elements are formed of low density polyethylene.

8. The mechanism of claim 1 wherein the filament is fishing line.

9. The mechanism of claim 8 wherein the fishing line has a hardness similar to that of nylon.

10. The mechanism of claim 1 wherein the elements further comprise respective substantially arctuate concave indentations located at facing locations within the gripping portion of the gap.

11. The mechanism of claim 10 wherein the substantially arctuate indentations define respective portions of a substantially circular channel.

12. The mechanism of claim 11 wherein the size of the channel is smaller than that of the filament.

13. The mechanism of claim 10 wherein the taper forming the funnel portion of the gap runs from the distal end to the indentations.

14. A mechanism for attaching a light stick to a filament, comprising:
   a first element, having a distal end, and a proximal end attached to the light stick at a relatively central position and tapered in a first direction;
   second and third elements, each having a distal end and a proximal end, the respective proximal ends attached to the light stick on either side of the first element, and each tapered in a second direction opposite the first direction to form a funnel portion;
   each of the first, second and third elements having a respective substantially arctuate concave indentation relatively near the proximal end of the funnel portion, wherein the respective indentations define a channel aligned along a transverse direction and adapted for gripping the filament.

15. The mechanism of claim 14 wherein the first, second and third elements are relatively flat, and placed parallel to each other in a transverse direction.

16. A mechanism for attaching a light. stick to a filament, comprising:
   a first element, having a distal end, and a proximal end attached to the light stick at a relatively central position and tapered in a first direction;
   second and third elements, each having a distal end and a proximal end, the respective proximal ends attached to the light stick on either side of the first element, and each tapered in a second direction opposite the first direction to form a funnel portion;
   each of the first, second and third elements having a respective substantially arctuate concave indentation relatively near the proximal end of the funnel portion, wherein the respective indentations define a channel aligned along a transverse direction and adapted for gripping the filament; wherein
      the first, second and third elements are relatively flat, and placed parallel to each other in a transverse direction; and
      the first, second an third elements are each right trianguloid in shape and substantially identical to each other.

17. The mechanism of claim 14 wherein the elements are formed of material softer than that of the filament.

18. The mechanism of claim 17 wherein the elements are formed of low density polyethylene.

19. The mechanism of claim 14 wherein the filament is fishing line.

20. The mechanism of claim 19 wherein the fishing line has a hardness similar to that of nylon.

21. The mechanism of claim 14 wherein the elements are formed of the same material as, and integrally with, the light stick.

22. The mechanism of claim 14 wherein the elements are formed of material which is relatively flexible.

23. The mechanism of claim 22 wherein the elements can move relative to each other.

24. The mechanism of claim 14 wherein the size of the channel is smaller than that of the filament.

25. A mechanism for attaching a light stick to a filament, comprising:
   a center element, having a distal end, a proximal end attached to the light stick at a relatively central position, and being tapered in a first direction;
   a member, having a distal end and a proximal end, and a semicircular cross-section along the direction between the distal and proximal end, the proximal end being attached to the light stick so that the center of the semicircular cross-section is located substantially at the location where the taper of the center element meets the light stick, wherein the ends of the semicircular cross-section are each tapered in a second direction opposite the first direction to form a funnel portion;
   wherein each of the center element and the ends of the semicircular cross-section has a respective substantially arctuate concave indentation relatively near the proximal end of the funnel portion, wherein the respective indentations are aligned along a transverse direction to define a channel adopted for gripping the filament.

26. The mechanism of claim 25 wherein the channel has a size which is longer in a first direction than in a second direction.

27. The mechanism of claim 26 wherein the size of the filament is larger than the size of the channel in the second direction.

28. The mechanism of claim 25 wherein the center element and the member are formed of material softer than that of the filament.

29. The mechanism of claim 25 wherein the center element and member are formed of the same material as, and integrally with, the light stick.

30. The mechanism of claim 25 wherein the center element and member are formed of material which is relatively flexible.

31. The mechanism of claim 30 wherein the center element and member can move relative to each other.

32. The mechanism of claim 25 wherein the elements are formed of low density polyethylene.

* * * * *